Figure 1:
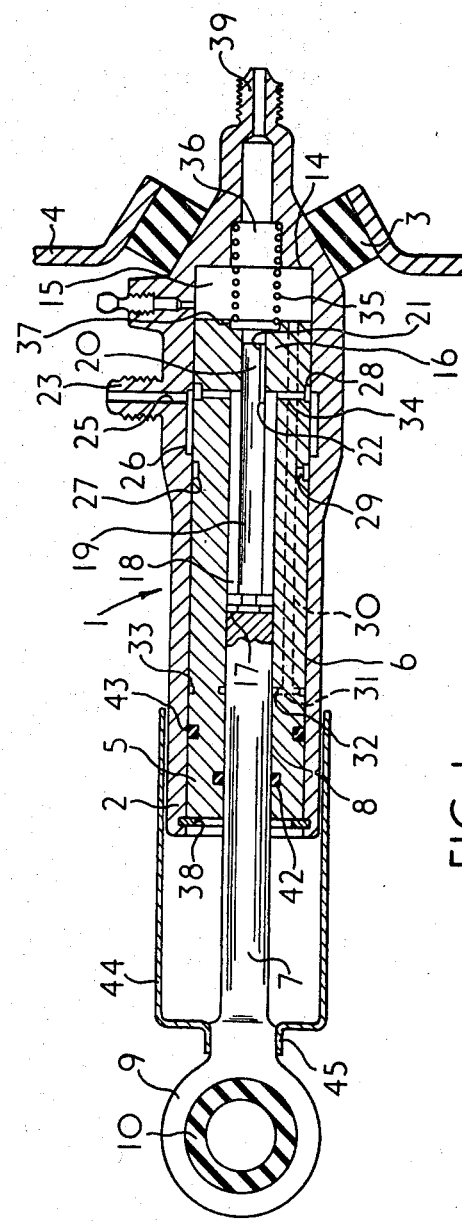

United States Patent

[11] 3,542,164

[72] Inventor Frank Radcliffe Mortimer
Coventry, England
[21] Appl. No. 800,602
[22] Filed Feb. 19, 1969
[45] Patented Nov. 24, 1970
[73] Assignee The Dunlop Company Limited
London, Fort Dunlop, Erdington, England
a corporation of Great Britain
[32] Priority Feb. 24, 1968
[33] Great Britain
[31] No. 9048/68

[54] SELF-SERVO, TORQUE RESPONSIVE BRAKE VALVING DEVICE
9 Claims, 2 Drawing Figs.
[52] U.S. Cl. ................................................. 188/152,
188/141, 303/24
[51] Int. Cl. .................................................... B60z 11/34

[50] Field of Search .................................. 188/151.11,
140A, 141, 152, 152.04, 103; 303/24, A, B, C, F

[56] References Cited
UNITED STATES PATENTS
2,093,543 9/1937 Bowen ........................... 188/152X
2,361,878 9/1944 Schnell ......................... 188/152UX
2,768,502 9/1956 Sherman et al. ............... 188/152X Primary Examiner—George E. A. Halvosa
Attorney—Jeffers and Young ABSTRACT: Self servodevice for a fluid pressure operated braking system, utilizing torque reaction developed by the brake to amplify the fluid pressure supplied to the brake and incorporating means for preventing an unlimited rise in the fluid pressure supplied to the brake and for adjusting the fluid pressure supplied to the brake so as to maintain a substantially constant torque reaction.

SELF-SERVO, TORQUE RESPONSIVE BRAKE VALVING DEVICE

This invention relates to braking systems and to self-servodevices for incorporation in fluid pressure operated braking systems.

One object of the invention is to provide an improved self-servodevice for incorporation in a fluid pressure operated braking system.

According to one aspect of the invention a self-servodevice for a fluid pressure operated braking system comprises a housing, an input chamber formed in the housing and arranged for connection to a source of input fluid pressure, a thrust member located in the housing and slidable within a pressure chamber arranged for connection to a fluid pressure operated brake-actuating mechanism of a brake, the housing and the thrust member being respectively arranged to be mounted so that at least part of the torque reaction thrust arising from application of the brake is transmitted through the thrust member, through fluid contained in the pressure chamber and the input chamber and through the housing, the device further comprising a balance member and a valve associated therewith, the balance member being arranged to be urged in opposite directions by forces exerted thereon and generated at least in part by the fluid pressures in the input chamber and the pressure chamber respectively, and being arranged to cause the valve to release fluid from the brake when said forces are out of balance.

According to another aspect of the invention a fluid pressure operated braking system comprises a self-servodevice, a brake having a fluid pressure operated actuating mechanism, and a source of fluid pressure, the self-servodevice comprising a housing, an input chamber formed in the housing and arranged for connection to the source of fluid pressure, a thrust member located in the housing and slidable within a pressure chamber arranged for connection to the fluid pressure operated actuating mechanism of the brake, the servodevice being mounted so that the thrust member may be caused to slide within the pressure chamber by torque reaction produced on application of the brake thereby increasing the fluid pressure in the pressure chamber, the servodevice further comprising a balance member and a valve associated therewith to release fluid from the brake-actuating mechanism when opposed forces acting on the balance member and generated at least in part by the fluid pressures in the pressure chamber and the input chamber respectively, are out of balance.

Figure 2:
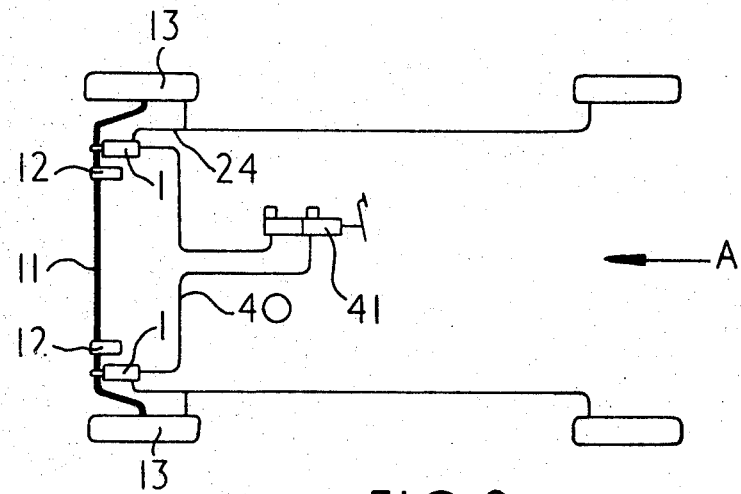

One embodiment of the invention will now be described by way of example with reference to the accompanying drawings in which:

FIG. 1 shows a cross-sectional view of a self-servodevice according to the invention; and FIG. 2 shows diagrammatically a fluid pressure operated braking system according to the invention, installed in a road vehicle.

A self-servodevice 1 for a fluid pressure operated braking system of a road vehicle comprises a housing 2 secured at one end through a resilient mounting 3 to a part 4 of the vehicle body.

A movable balance member in the form of a sleeve 5 is slidably received in a bore 6 formed in the housing and one end of a rodlike thrust member 7 is slidably located within the internal bore 8 of the sleeve.

The other end of the thrust member 7 is formed into an eye 9 containing an annular rubber vibration damping bush 10, through which extends an antiroll bar 11 (see FIG. 2) associated with the front axle of the vehicle. The antiroll bar is connected at its two extreme ends to the front wheel axles (not shown) of the vehicle and has mounting plates 12 secured thereto, one at each of two spaced-apart intermediate points along the bar, which are fastened to the vehicle body (not shown) and comprise flexible rubber mountings (not shown) which allow fore and aft suspension compliance and transmit to the vehicle body all the drag force generated by the front wheel brakes (not shown). The thrust member 7 of each self-servodevice is secured to the antiroll bar between its respective mounting plate 12 and the front wheel 13 which is nearer thereto.

The space between the axially innermost end of the sleeve 5 with respect to the bore 6 formed in the housing 2, and the end 14 of the bore, constitutes an input chamber 15 arranged for connection to a source of input fluid pressure. The sleeve 5 is formed with a reduced internal diameter end portion 16 at its axially inner end with respect to the bore 6 formed in the housing 2 and the end 14 of that bore, and the portion of the internal bore 8 of the sleeve which at any given time lies between the end 17 of the thrust member 7 and the reduced internal diameter end portion 16 of the sleeve constitutes a pressure chamber 18 for connection to a fluid pressure operated brake-actuating mechanism of a brake of the braking system. The housing 2 and the thrust member 7 are thus mounted so that at least part of the torque reaction thrust arising from application of the brake is transmitted through the thrust member, through fluid contained in the pressure chamber 18 and the input chamber 15 and through the housing to nonrotatable component 4 of the vehicle body.

A closure member in the form of a rod 19 associated with the thrust member 7 and which may be formed integrally therewith, but which in this embodiment is formed for convenience as a separate member, is slidably received at its first end 20 in the reduced diameter end portion 16 of the sleeve 5.

The first end 20 of the closure member has formed therein a groove 21 extending axially with respect to the closure member for a distance along the surface thereof to enable fluid communication to be established between the pressure chamber 18 and the input chamber 15 through the groove. The groove extends from the end of the closure member and terminates at a shoulder 22 formed in the closure member. When the shoulder is located within the reduced internal diameter portion 16 of the sleeve 5 communication between the pressure chamber and the input chamber is cutoff. Communication is reestablished when the closure member moves axially outwardly to bring the shoulder into the pressure chamber.

A fluid outlet connection 23 is provided on the housing for engagement with a fluid pressure line 24 (See FIG. 1) leading to the brake (not shown). The fluid outlet connection communicates with the bore 6 formed in the housing 2 through an outlet drilling 25 formed in the housing. The outlet drilling terminates at its inner end by opening into the axially innermost end of a wide annular channel 26 formed in the bore 6 of the housing.

First and second openings 27 and 28 constituting release and supply passages respectively and communicating with the input chamber 15 and with the pressure chamber 18 respectively are formed in the sleeve. The openings are separately connectable with the outlet drilling 25 formed in the housing 2 by axial movement of the sleeve 5 within the bore 6, to bring the openings into alignment with the annular channel 26 formed in the bore. The arrangement is such that the sleeve may be moved to a balanced position in which the first and second openings are positioned one on each side of the wide annular channel, neither opening communicating therewith. Axial movement of the sleeve in either direction then brings the respective opening into communication with the wide annular channel.

The portion of the housing in which the wide annular channel 26 is formed, together with the portion of the sleeve 5 in which the first opening 27 is formed, constitute a slide valve associated with the balance member to release fluid from the brake-actuating mechanism when the fluid pressure in the pressure chamber 18 arising from at least part of the brake's torque reaction exceeds the fluid pressure in the input chamber 15 by more than a predetermined amount, as will be explained.

The first opening 27 formed in the sleeve 5 is in the form of an annular channel extending around the outer circumference of the sleeve, and communicating through a first radial drilling 29 with an axial drilling 30 formed in the sleeve. The axial drilling extends from the input chamber 15 towards the other, axially outer, end of the sleeve. The first radial drilling communicates with the axial drilling about half way along the length thereof and the axial drilling terminates in the region of the axially outer end of the sleeve. In the region of the said axially outer end of the sleeve, the end of the axial drilling is connected by a second radial drilling 31 with two concentric annular grooves 32, 33 formed respectively on the radially inner and radially outer surfaces of the sleeve. The annular grooves provide a return passage for fluid leaking between the sleeve and the bore 6 formed in the housing 2, and between the sleeve and the thrust member 7, as a result of the high fluid pressures which are generated during operation of the servodevice 1, as will be explained.

The second opening 28 formed in the sleeve 5 is also in the form of an annular channel extending around the outer circumference of the sleeve, and it communicates through third radial drillings 34 with the axially innermost end of the pressure chamber 18, that is, the end of the pressure chamber adjacent the reduced internal diameter end portion 16 of the sleeve.

The first opening 27 formed in the sleeve 5 is spaced apart in an axial direction from the second opening 28 by a distance a little greater than the width of the annular channel 26 formed in the bore 6 of the housing 2 and which leads to the fluid outlet connection 23.

One end of a coil spring 35 is located in a reduced diameter portion 36 of the input chamber 15 at the axially innermost end thereof. The coil spring extends axially across the input chamber, engaging at its other end in a recess 37 formed in the sleeve 5 and biasing the sleeve axially outwardly with respect to the housing 2.

Axially outward movement of the sleeve 5 with respect to its bore 6 in the housing 2 is limited by a spring circlip 38 detachably located in an annular groove formed in the bore of the housing at its axially outermost end. The circlip extends radially into the bore and provides a stop for the sleeve.

A fluid inlet connection 39 for engagement with a fluid pressure line 40 (see FIG. 2) from a driver's master cylinder 41 is formed on the housing at the axially innermost end of the input chamber 15.

Rubber sealing rings 42, 43 are provided on the radially inner and outer surfaces of the sleeve 5 near its axially outermost end with respect to the housing 2, to engage respectively the thrust member 7 and the sidewall of the bore 6 formed in the housing.

A cover member 44 is provided to prevent the ingress of dirt into the servodevice 1 and in particular to protect the thrust member 7 from such dirt. The cover member is in the form of a cylinder having a short axially-extending neck portion 45 secured to the thrust member adjacent the eye 9 formed therein. At its other end, the cover member 2 is a sliding fit on the outer surface of the housing 2, the cover member thus being assembled in telescoping relation with the housing.

The mode of operation of the servodevice 1 will now be described.

Before application of the brakes, that is, when the servodevice is unenergized, the various parts thereof are arranged as follows. The sleeve 5 is held in a retracted position by the coil spring 35 which maintains the axially outer end of the sleeve in engagement with the circlip 38, and the thrust member 7 is also in a retracted position.

In its retracted position, the sleeve 5 is disposed within the bore of the housing so that the second opening 28 formed in the sleeve communicates through the wide annular channel 26 and the outlet drilling 25 with the fluid outlet connection 23.

When the thrust member 7 is in its retracted position, residual fluid pressure in the input chamber 15 urges the closure member 19 axially outwardly thus holding the closure member in engagement with the thrust member. In this position the groove 21 formed in the closure member allows communication between the pressure chamber 18 and the input chamber 15 through the reduced internal diameter end portion 16 of the sleeve 5.

Thus, in the unenergized condition of the servodevice 1, fluid can pass from the inlet connection 39 through the input chamber 15, through the reduced internal diameter end portion 16 of the sleeve 5, the third radial drillings 34 and the second opening 28 formed in the sleeve and so to the fluid outlet connection 23 and the brakes.

When a driver initially applies the brakes of the system, the pressure generated in his master cylinder 41 is communicated to the brakes by the route described in the last preceding paragraph.

The antiroll bar 11 is connected at its two extreme ends to the front wheel axles (not shown) of the vehicle and at two intermediate points through mounting plates 12 to the body (not shown) of the vehicle. Between each end of the antiroll bar and the nearer mounting plate thereon, the bar is deflected when the brakes are applied. This is as a result of forward movement in the direction of arrow A as seen in FIG. 2, of the vehicle body on its suspension relative to the wheels, due to the momentum of the vehicle body when the brakes are applied.

The eye 9 of the thrust member 7 is mounted on the antiroll bar 11 between one end thereof and the nearer mounting plate 12 of the bar. As a result of deflection of the bar, the thrust member 7 is therefore moved a short distance rearwardly with respect to the body of the vehicle. The housing 2 of the servodevice is mounted directly on the body however, and therefore brake application causes axially inward movement of the thrust member 7 relative to the housing. The forces causing this movement are proportional to the torque reaction acting on the brake.

As the torque reaction increases, the thrust member 7 is moved axially inwardly relative to the sleeve 5, moving the closure member 19 through the reduced internal diameter end portion 16 of the sleeve and cutting off communication between the pressure chamber 18 and the input chamber 15. The effect of the closure member cutting off communication between the pressure chamber and the input chamber is to disconnect the driver's master cylinder 41 from the brakes as soon as sufficient torque has been generated as a result of the initial application of the brakes by fluid pressure from the driver's master cylinder.

At the time when the disconnection referred to in the last paragraph occurs, obviously, the fluid pressures in the pressure chamber 18 and the input chamber 15 are substantially the same.

After disconnection of the input chamber 15 from the pressure chamber 18 however, any further inward movement of the thrust member 7 relative to the sleeve 5 increases fluid pressure in the pressure chamber and in the brake operating cylinders thus establishing a positive energy feedback loop from the brakes through the antiroll bar and so to the servodevice 1. As the fluid pressure in the brake cylinder rises, so the torque reaction increases and produces a yet further fluid pressure increase.

The servodevice 1 is however provided with means for preventing an unlimited rise in fluid pressure in the pressure chamber 18 and the brake cylinders, and for reducing the fluid pressure in the pressure chamber and the brake cylinders when the fluid pressure in the pressure chamber arising from the brake's torque reaction exceeds a value which depends on the fluid pressure in the input chamber 15. This is achieved as follows.

After the closure member 19 has passed sufficiently far through the reduced internal diameter end portion 16 of the sleeve 5 to cutoff communication between the pressure chamber 18 and the input chamber 15, the axial position of the sleeve within the bore 6 in the housing 2 is controlled by the relative magnitudes of the axially-directed forces acting on the sleeve in the input and pressure chambers.

In the input chamber 15, the axially-directed force acting on the sleeve 5 arises from the fluid pressure generated by the driver's master cylinder 41 acting on the end of the sleeve over an area which is substantially the cross-sectional area of the bore 6 in which the sleeve is located, less the transverse cross-sectional area of the closure member 19.

In the pressure chamber 18, the axially directed force acting on the sleeve 5 in opposition to the force acting thereon in the input chamber 15 arises from the fluid pressure in the pressure chamber acting on the radially extending annular area provided by the sleeve where its internal diameter is reduced and which constitutes one end of the pressure chamber. Thus the fluid pressure in the pressure chamber acts to produce axially directed forces on the sleeve over a much smaller area than the fluid pressure in the input chamber.

In this embodiment of the invention the area differential is chosen so that the area ratio is 7.5 to 1. Thus, ignoring the axial thrust of the the coil spring 35 in the input chamber 15, which is negligible, the pressure required in the pressure chamber 18 to produce an axially directed force acting on the sleeve which balances that acting in the opposite direction produced by the fluid pressure in the input chamber, is 7.5 times the pressure in the input chamber. As long as the fluid pressure in the pressure chamber is lower than this value therefore, the sleeve is held by the coil spring against the circlip.

Thus, during brake operation, the pressure in the pressure chamber 18 developed by axially inward movement of the thrust member 7 continues to rise until it is substantially 7.5 times that in the input chamber 15, at which time the axially directed forces acting on the sleeve 5 balance. Any further inward movement of the thrust member causes a pressure rise in the pressure chamber and puts the said forces out of balance, thus causing the sleeve also to move axially inwardly.

Such axially inward movement of the sleeve 5 however connects the first opening 27 in the sleeve with the annular channel 26 formed in the bore 6 in the housing 2 and hence to the brake cylinders, and therefore effects communication between the brake cylinders and the input chamber 15. The fluid pressure in the input chamber is of course approximately 7.5 times lower than that in the brakes and consequently such communication allows a reduction of pressure in the brake cylinders by flow of fluid into the input chamber through the axial drilling 30 formed in the sleeve.

The torque reaction decreases as the fluid pressure in the brakes decreases and therefore as soon as a little brake fluid has been released to the input chamber 15, the sleeve 5 moves axially outwardly to cutoff communication between the brake cylinders and the input chamber. In other words, the balance member or sleeve is arranged to be urged in opposite directions by forces exerted thereon and generated at least in part by the fluid pressures in the input chamber and the pressure chamber 18 respectively and is arranged to cause the valve associated therewith to release fluid from the brake when the said forces are out of balance, so as to bring the system into a balanced condition.

At the balance point the brake cylinders are connected neither to the pressure chamber nor to the input chamber since the 'land' between the first and second openings 27, 28 respectively in the sleeve 5 is located over the annular channel 26 formed in the bore 6 of the housing. If further increase in torque reaction occurs, the sleeve moves axially inwardly again as described above to release a little more brake pressure, and it will be seen therefore that this sequence of movements effectively adjusts the fluid pressure supplied to the brakes to maintain a substantially constant torque reaction.

Thus the servodevice of the present invention not only produces an output fluid pressure which by appropriate choice of dimensions of the various parts of the unit can be chosen to be any reasonable multiple of the input fluid pressure, but operates to maintain a substantially constant torque reaction corresponding to this output pressure. Effectively therefore the comparatively low fluid pressure produced by a driver on operating his master cylinder selects a brake torque reaction corresponding to a higher fluid pressure in the brake cylinders, and the servodevice operates to maintain this torque reaction substantially constant.

It will be understood that since the servodevice operates to maintain a high and substantially constant torque reaction, corresponding to a driver's comparatively low master cylinder output pressure, any tendency for the torque reaction to decrease for reasons—e.g. brake fade—other than release of pedal pressure by the driver, will be automatically counteracted. For example, if the brakes begin to fade on account of overheating during a prolonged brake application, the torque reaction developed by the brakes will decrease, and the pressure in the pressure chamber will fall a little. The balance member 5, previously in a balanced condition, will move axially outwardly in the housing 2, to reconnect the vehicle brakes to the pressure chamber 18 and reestablish a positive feedback loop from the brakes through the vehicle suspension to the thrust member, the pressure chamber and so back to the brakes through the fluid pressure line 24. Once the loop is reestablished the servodevice operates to amplify the fluid pressure supplied to the brakes until the torque reaction developed by the brakes once more corresponds to the fluid pressure developed by the driver's master cylinder.

The invention is applicable to aircraft as well as to land vehicles and is particularly suitable for aircraft of insufficient size to justify the provision of brake servo units energized by the aircraft engines, yet which require the pilot, if he has no mechanical assistance, to exert a very considerable brake pedal pressure during landing.

Among the advantages provided by the embodiment of the invention described above are the reduction of vehicle suspension compliance during braking, the easy adaptation of the servodevice for incorporation in brake systems including dual fluid pressure supplies, and the easy adaptation of the device for mounting on various suspension systems such as those of semitrailers. Furthermore the device is cheap, can easily be included as part of a brake, and, as explained above, provides automatic compensation for brake fade.

It should be noted that in practice it is desirable to provide, in addition to the coil spring 35 at one end of the housing 2, a second coil spring located in an extension of the other end of the housing. Both coil springs have a high rate, and operate to bias the balance member 5 very strongly towards its balanced position in which the release passage and the supply passage formed therein are located one on each side of the annular channel 26, neither of them communicating therewith. Further it is also desirable to provide small wedge-shaped metering cuts in the respective side edges of the first and second openings 27 and 28 respectively formed in the sleeve 5, so as to allow only a progressively less restricted flow of fluid therethrough upon small movement of the balance member from the balanced condition. In this way the amount of flow through the openings is, for small displacements of the balance member, proportional to the displacement. Both of the features referred to in this paragraph improve the operation of the servodevice by enhancing its stability and overcoming any tendency the balance member might otherwise have to 'hunt' up and down in the housing 2.

I claim:

1. A fluid pressure operated braking system comprising a self-servodevice, a brake having a fluid pressure operated actuating mechanism, and a source of fluid pressure, the self-servodevice comprising a housing, an input chamber formed in the housing and arranged for connection to the source of fluid pressure, a thrust member located in the housing and slidable within a pressure chamber arranged for connection to the fluid pressure operated actuating mechanism of the brake, the servodevice being mounted so that the thrust member may be caused to slide within the pressure chamber by torque reaction produced on application of the brake thereby increasing the fluid pressure in the pressure chamber, the servodevice further comprising a balance member and a valve associated therewith to release fluid from the brake-actuating mechanism when opposed forces acting on the balance member and generated at least in part by the fluid pressures in the pressure chamber and the input chamber respectively, are out of balance.

2. A self-servodevice for a fluid pressure operated braking system, comprising a housing, an input chamber formed in the housing and arranged for connection to a source of input fluid pressure, a thrust member located in the housing and slidable within a pressure chamber arranged for connection to a fluid pressure operated brake-actuating mechanism of a brake, the housing and the thrust member being respectively arranged to be mounted so that at least part of the torque reaction thrust arising from application of the brake is transmitted through the thrust member, through fluid contained in the pressure chamber and the input chamber and through the housing, the device further comprising a balance member and a valve associated therewith, the balance member being arranged to be urged in opposite directions by forces exerted thereon and generated at least in part by the fluid pressures in the input chamber and the pressure chamber respectively, and being arranged to cause the valve to release fluid from the brake when said forces are out of balance.

3. A self-servodevice according to claim 2 wherein the balance member is in the form of a sleeve, slidably mounted in a bore formed in the housing and having a reduced internal diameter end portion, the thrust member being slidably received in the internal bore of the sleeve and a closure member associated with the thrust member being slidable in the reduced internal diameter end portion of the sleeve to interrupt or reestablish fluid pressure communication between the input chamber and the pressure chamber.

4. A fluid pressure operated vehicle braking system comprising a source of fluid pressure, a brake having a fluid pressure operated actuating mechanism and a self-servodevice according to claim 2.

5. A self-servodevice according to claim 2 wherein means acting on the balance member is provided to resist movement of the balance member under the action of forces exerted thereon arising from the fluid pressures in the input and pressure chambers.

6. A self-servodevice according to claim 5 wherein the said means acting on the balance member is constituted by a pair of compression springs acting one on each end of the balance member.

7. A self-servodevice according to claim 2 wherein the valve associated with the balance member is in the form of a slide valve operable to release fluid from the brake by alignment of a release passage formed in a movable member, with an opening formed in the housing and connectable to a fluid pressure operated braked actuating mechanism of a brake.

8. A self-servodevice according to claim 7 wherein the balance member is slidably located in the housing and constitutes the said movable member, the release passage formed therein communicating with the input chamber.

9. A self-servodevice according to claim 8 wherein the balance member has a supply passage formed therein at a position spaced from the release passage, the supply passage communicating with the pressure chamber and being alignable with the said opening formed in the housing, the arrangement being such that in the balanced condition of the balance member, the said opening formed in the housing is located between the supply and release passages, whereby any change of pressure in the input or pressure chambers will effect connection of the said opening either to the input chamber or to the pressure chamber.